July 29, 1969  H. PÖSCH  3,457,606
INJECTION MOULDING APPARATUS
Filed March 17, 1966  2 Sheets-Sheet 1

Inventor:
HEINZ PÖSCH
William Frederick Thomas
ATTORNEY

United States Patent Office 3,457,606
Patented July 29, 1969

3,457,606
INJECTION MOULDING APPARATUS
Heinz Pösch, Konigsalle 14h.,
1 Berlin 33, Germany
Filed Mar. 17, 1966, Ser. No. 535,067
Claims priority, application Germany, Mar. 23, 1965,
E 28,936
Int. Cl. B28b 1/26, 21/08
U.S. Cl. 25—30                5 Claims

ABSTRACT OF THE DISCLOSURE

This specification discloses moulding apparatus for moulding non-flat articles from aqueous fibrous cement and comprises a reservoir for the cement, a mould and cylinder and piston assembly which draws cement from the reservoir and delivers it under high pressure to the mould. The walls of the latter are formed with bores and are lined with a layer of foraminous material comprising a screen and filter cloth.

---

It is known to manufacture fibrous cement mouldings which differ in shape from flat or corrugated sheets, for example tubes, by injecting an aqueous suspension of fibrous cement into the cavity of a mould which is porous to one side and receives one or more rubber cores which can be inflated or pumped up. After the injection operation the cores are widened up by a pressure medium, so that the area of the mould cavity filled with the suspension is reduced in size to remove water from the moulding and densify it. The main disadvantage of this prior art method is that the movement which the rubber has to make for densification and removal of the water means that the ability of the mouldings to maintain their sizes and shapes are very adversely affected.

The invention, which obviates this disadvantage, relates to a method and an apparatus for the performance of the method, namely a method of manufacturing non-flat, for instance tubular fibrous cement mouldings by the injection of an aqueous suspension of fibrous cement into a correspondingly shaped moulding cavity. According to the invention an injection pressure is used of at least 25 atmospheres gauge. Such high injection pressures have not hitherto been used in the manufacture of fibrous cement mouldings. On the contrary, the prior art injection method meant that only relatively low positive pressures could be used, of a value much less than the lower limit according to the invention.

For the performance of the method the fibrous cement suspension for injection has to be adequately pressurized by a hydraulic system. The hydraulic system must also enable the pressure and quantity of the suspension to be controlled during the duration of injection. Injection controlled in dependence on the size and shape of the required moulding is necessary to remove water from the moulding and adequately densify it.

The method according to the invention has the advantage that the moulds and any necessary cores can be completely made of a rigid material, such as metal, wood, plastics, etc. At least those parts of the moulds which bear against the outside or inside surfaces of the required mouldings must be permeable to water in known manner. In general the permeability to water is produced by the mould components being formed with bores which are covered with screens, and if necessary with filter cloths also, to give the moulding as smooth a surface as possible.

Embodiments of the elements required for the performance of the method are diagrammatically illustrated in the accompanying drawings, wherein.

Figure 1:
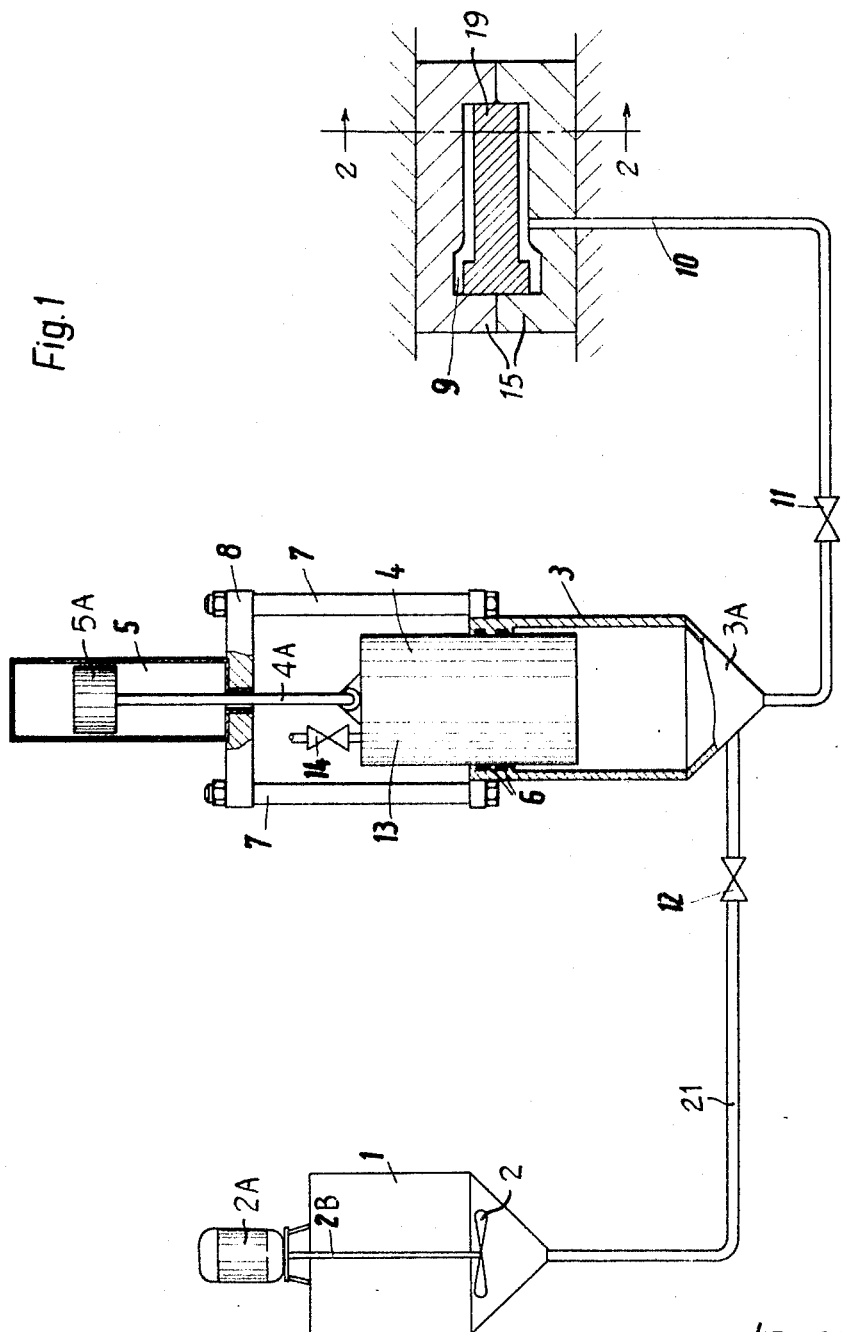
FIG. 1 shows the necessary elements diagrammatically.

A reservoir 1 receives a certain quantity of an aqueous suspension of fibrous cement, which is prevented from settling by an agitator 2. An injection apparatus comprises a pressure cylinder 3 which has a bottom conical tip and in which a displacing piston 4 is moved by a hydraulic cylinder 5. The cylinder 3 is open at the top and sealed off from atmosphere by packings 6 against the piston 4. The cylinder 5, comprising tie-rods 7 and a transverse member 8, is disposed on the cylinder 3. The moulding cavity 9 is held together in a suitable device, such as a press, and connected via a pipe 10 having a valve 11 to the cylinder 3.

To fill the cylinder 3, the valve 11 is closed and a valve 12 in the pipe extending to the suspension reservoir 1 is opened. The piston 4 is raised by the hydraulic cylinder 5 and therefore sucks in the suspension from the reservoir 1. The valve 12 is then closed, the piston 4 descends and air is removed from the cylinder 3 via a pipe 13 and a valve 14. For injection the valve 11 is opened and the piston 4 is driven into the cylinder 3 with a force such as to produce therein a pressure of at least 25 atmospheres gauge. The injection pressure is maintained for a period corresponding to the size and shape of the moulding to be produced, to ensure that enough water is removed from the moulding and that the moulding is adequately densified. The valve 11 is then closed, the valve 12 is opened and the piston 4 is raised to refill the cylinder 3. Finally, the moulding cavity 9 is opened and the resulting moulding is removed, already possessing adequate strength if the process has been performed correctly.

Figure 2:
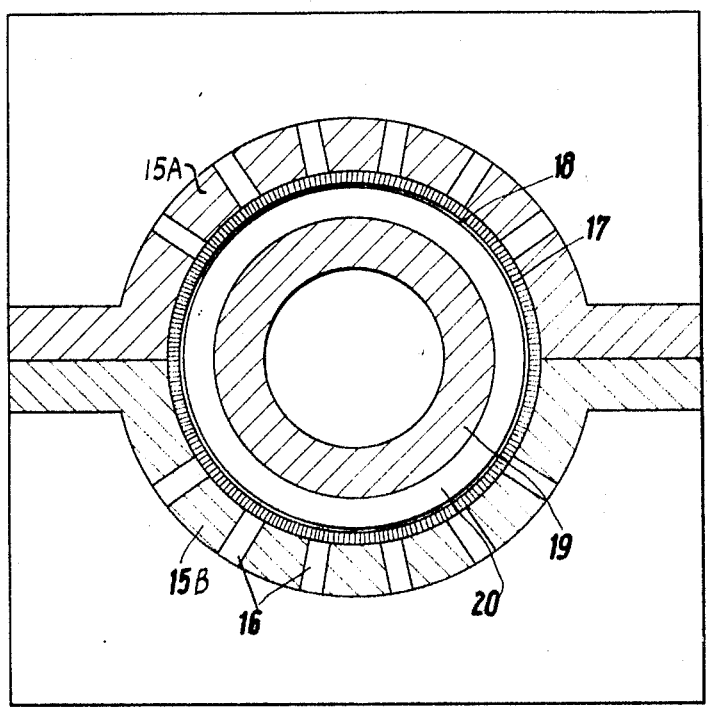
FIG. 2 is a cross-section through the mould to be used.

Referring to FIG. 2, a moulding cavity is formed by a rigid generated surface 15 formed with radial bores 16 for the removal of water. Disposed on the inside of the generated surface 15 is a screen 17 which can be covered with a filter cloth 18 in the direction of the moulding to be produced. The mould receives a rigid core 19. The resulting cavity 20 receives the injected suspension.

I claim:
1. Apparatus for manufacturing fibrous cement non-flat articles such as pipe comprising:
 (a) a reservoir for containing an aqueous suspension of fibrous cement,
 (b) a mould for shaping the final article of fibrous cement,
 (c) a cylinder and displacement piston capable of imposing a pressure of at least 25 atmospheres gauge on said cement, said cylinder including:
   (I) a main body portion of uniform cross-section having a diameter slightly in excess of that of the piston, and
   (II) a conical tip the larger end of which is connected to an end of said body portion and having a small discharge opening,

(d) a conveying pipe between said reservoir and said conical tip,
(e) a control valve in said pipe, and
(f) a second conveying pipe between said discharge opening and said mould.

2. The apparatus of claim 1 in which there is a control valve included in said second pipe.

3. The apparatus of claim 1 in which the mould is of rigid material and is formed with radial bores through which fluid is exhausted as an incident to the moulding operation.

4. The apparatus of claim 3 in which the interior of the mould is lined with a layer of foraminous material.

5. The apparatus of claim 3 in which the interior of the mould is lined with a layer of foraminous material comprising a screen and filter cloth.

References Cited

UNITED STATES PATENTS

| 1,948,989 | 2/1934 | McEwan. | |
| 2,311,358 | 2/1943 | Baily. | |
| 2,474,721 | 6/1949 | Billner. | |
| 2,964,822 | 12/1960 | Tomkins | 264—86 |
| 3,054,147 | 9/1962 | Archibald | 264—86 |
| 3,218,375 | 11/1965 | Hardwick. | |
| 3,243,860 | 4/1966 | Whittaker et al. | |

FOREIGN PATENTS

| 1,195,860 | 5/1959 | France. |

WILBUR L. McBAY, Primary Examiner

U.S. Cl. X.R.

18—30; 25—103, 118; 264—86